United States Patent [19]

Mino

[11] Patent Number: 4,488,168
[45] Date of Patent: Dec. 11, 1984

[54] VECTOR SCOPE

[75] Inventor: Yoshikatu Mino, Kanagawa, Japan

[73] Assignee: Leader Electronics Corp., Yokohama, Japan

[21] Appl. No.: 300,409

[22] Filed: Sep. 8, 1981

[30] Foreign Application Priority Data

Mar. 27, 1981 [JP] Japan .................................. 56-44833

[51] Int. Cl.³ .......................... H04N 9/46; H04N 9/62
[52] U.S. Cl. .......................................... 358/10; 324/88
[58] Field of Search .................... 358/10, 139; 324/86, 324/88

[56] References Cited

U.S. PATENT DOCUMENTS 3,614,304 10/1971 Schonfelder .......................... 358/10
3,820,156 6/1974 Schulz .................................. 358/10
3,850,412 11/1974 Olson .................................... 358/10

OTHER PUBLICATIONS

Measurement Techniques in TV Studios and Outside Broadcasts, by I. H. Teear, et al., The Radio and Electronic Engineer, vol. 41, No. 3, pp. 113-125.

Tektronix Inc. Catalog, pp. 77-83, Models 520A, 521A and 522A.
Philips Electronic Instruments, Inc. Catalog, Model PM 5567.
Electronic Visuals Limited Catalog, Model EV 4020.
Videotek, Inc. Catalog, Model VSM-5.

Primary Examiner—Tommy P. Chin
Attorney, Agent, or Firm—Biebel, French & Nauman

[57] ABSTRACT

In a method and a vector scope for measuring distortion of a subcarrier signal causing color aberration of a color television signal, a carrier chrominance signal resulting from a color bar signal transmitted in a transmission system and a reference carrier chrominance signal including a signal determining levels of the amplitude and phase distortions of said carrier chrominance signal are demodulated through the same demodulating device and color difference signals thus obtained are displayed in vector, whereby only the distortion of the subcarrier by the transmission system is measured independently of the influence of the distortion of the vector scope itself.

17 Claims, 10 Drawing Figures

VECTOR SCOPE

BRIEF SUMMARY OF THE INVENTION

The present invention relates to a vector scope and, more particularly, to a method and an apparatus for accurately measuring, by a marker, amplitude distortion and phase distortion of a subcarrier of a color television signal.

In a color television system of any of NTSC and PAL systems, subcarrier is modulated in quadrature two phase with color difference signals, namely R-Y signal and B-Y signal and are transmitted as a carrier chrominance signal. Amplitude and phase distortions of the subcarrier caused by wire or wireless transmission systems during transmission of color television signals are undesirable because of a color aberration possibility responsible for by said distortions. In order to secure satisfactory color image, the amplitude distortion must be maintained within ±10% in the total transmission system and within ±2.5% in each transmission device, and the phase distortion must be maintained within ±20° in the total transmission system and within ±1°-2° in each transmission device.

Figure 1:
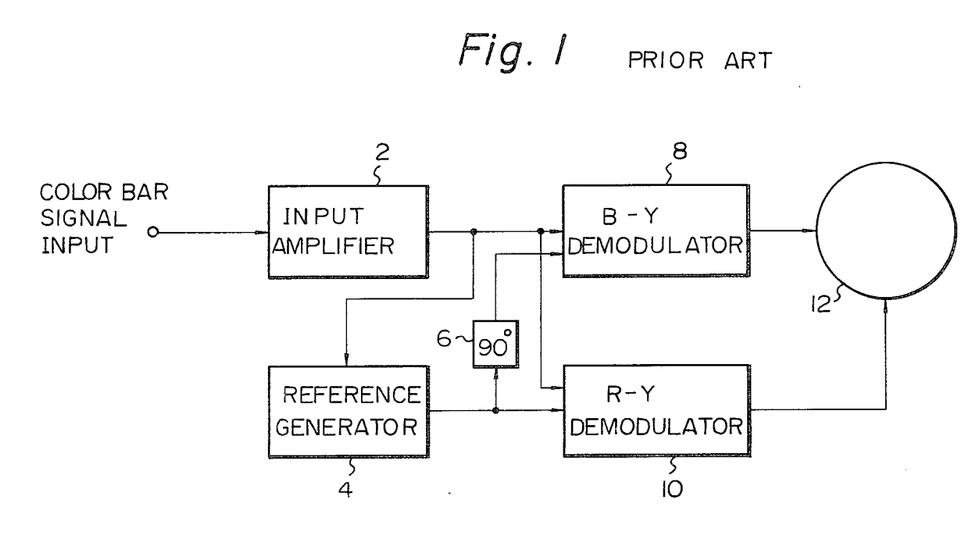
FIG. 1 is a block diagram of a conventional vector scope.

Heretofore, a vector scope as shown in FIG. 1 has been used for measuring the amplitude and phase distortions of the subcarrier by the transmission system. In such a vector scope, a color bar signal for adjustment inputted to an input terminal of the transmission system to be measured was received at an output terminal thereof to derive subcarrier component only, which was demodulated by a B-Y axis demodulator 8 and an R-Y axis demodulator 10, and color difference signals of the transmitted color bar signal were displayed on a cathode ray tube 12. On the face of the CRT 12, there was provided a scale plate (not shown) with marks thereon indicating ranges of errors in amplitude and phase of vector of each color signal of the transmitted color bar signal, for comparing the color vectors displayed on the CRT 12 with the scale to measure these amplitude and phase distortions. Because of measurement by comparing the color vectors displayed on the CRT with the scale of the scale plate, not only the distortions of the transmission system but also the distortions of the measurement devices such as the demodulators 8 and 10 and the CRT 12 of the vector scope were inevitably included in the distortions of the subcarrier in the measurement results. The distortion of cathode ray tubes was as a whole as high as 3-5%. Accordingly, the conventional vector scope had a disadvantage that it inevitably required the use of a highly expensive CRT having a distoriton as low as approximately 1% and demodulators having highly accurate elements and a circuit construction.

The object of the present invention is to provide a method and an apparatus capable of overcoming disadvantages of the conventional vector scopes and measuring phase and amplitude distortions of subcarrier without incurring much expenses and assuring high accuracy independently of the accuracies of demodulator circuits and a cathode ray tube.

To achieve the above-mentioned object, in the present invention, a subcarrier signal of a transmitted color bar signal derived from the output terminal of the transmission system to be measured and a marker signal for generating markers each indicating amplitude error level and phase error level of each of color vectors of the transmitted color bar signal are applied alternately to the demodulators and are displayed alternately on a display device such as a cathode ray tube. By such construction, the measured subcarrier signal and the marker signal as the reference thereof are distorted substantially equally by the demodulators and the cathode ray tube, so that the distortion of the subcarrier caused substantially only by the transmission sytem to be measured can be detected through comparison of the vectors of the color signals displayed on the cathode ray tube or the like with the corresponding markers.

BRIEF DESCRIPTION OF DRAWINGS

The invention will be better understood from the following description made in connection with the accompanying drawings in which:

FIG. 10 illustrates signal wave forms of the circuit in FIG. 9.

DETAILED DESCRIPTION OF THE INVENTION

Figure 2:
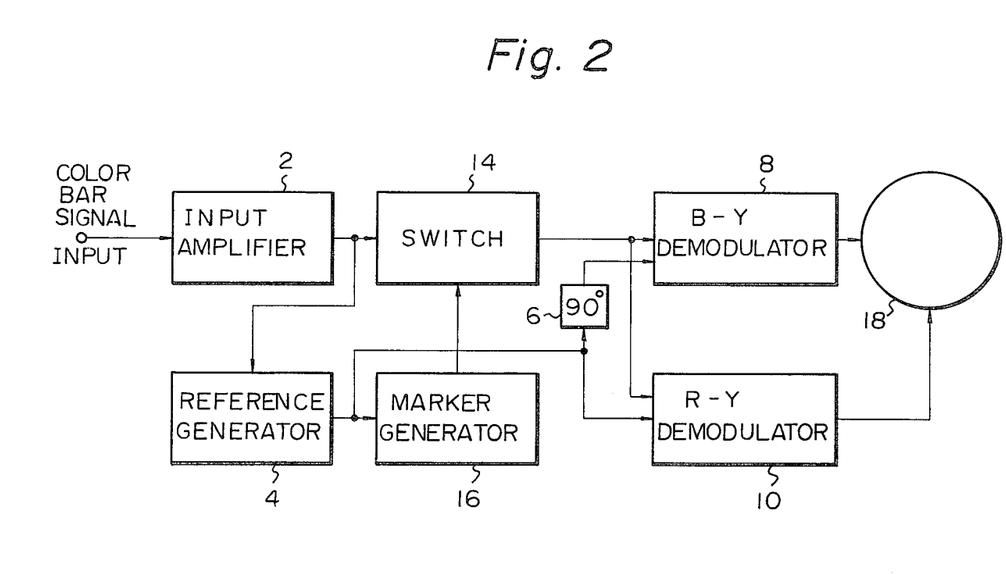
FIG. 2 (is a block diagram of a vector scope constructed according to the present invention.

With reference to the drawing, and more particularly, to FIG. 2, there is shown a block diagram of the vector scope constructed according to the present invention, in which the same parts as those of the conventional vector scope shown in FIG. 1 are shown by the same reference numerals. The vector scope according to the present invention applied to NTSC system comprises an input amplifier 2 for receiving a transmitted color bar signal derived from an output terminal of the transmission system to be measured to which the color bar signal was inputted, band-amplifying it and outputting a subcarrier signal or a carrier chrominance signal, a reference generator 4 for receiving said subcarrier signal, and a switch 14. The reference generator 4 detects a color burst of the subcarrier signal inputted thereto and applies a reference subcarrier signal to a marker generator 16 and an R-Y axis demodulator 10 and further to a 90° phase shifter 6 which shifts the inputted reference subcarrier signal 90° in phase and applies it to a B-Y axis demodulator 8.

The marker generator 16, the characteristic feature of the present invention, generates a marker signal indicating the error levels of each of vectors of color signals included in the transmitted color bar signal displayed on a cathode ray tube 18, and applies said signal to the switch 14. The switch 14, which receives as inputs the measured subcarrier signal from the input amplifier 2 and the marker signal from the marker generator 16, applies alternately these two inputs at a predetermined frequency (for example, at an arbitrary frequency between 100 Hz and 10 KHz) to both the demodulators 8 and 10, each of which generally comprises a multiplier, respectively. The B-Y axis demodulator 8 multiplies the output from the switch 14 by the 90° phase-shifted reference subcarrier signal from the 90° phase shifter 6 and applies the B-Y axis color difference signal derived from the multiplication to the horizontal input of the CRT 18. On the other hand, the R-Y axis demodulator 10 multiplies the output from the switch 14 by the reference subcarrier signal not shifted in phase, and applies the R-Y axis color difference signal to the vertical input of the CRT 18. The CRT 18 displayes alternately in vector color signals exclusive of white and black included in the demodulated transmitted color bar signal and the marker signal at a rate corresponding to the switching frequency of the switch 14. In the CRT 18, the scale plate as used in the CRT 12 of the conventional vector scope shown in FIG. 1 is not required.

Figure 3:
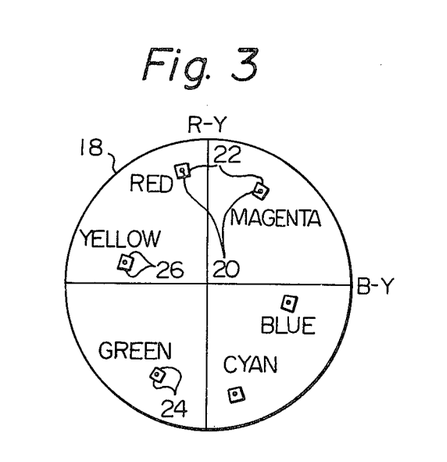
FIG. 3 is an illustration of display on the cathode ray tube of the vector scope according to the present invention.

FIG. 3 shows an example of display on the CRT 18 in which the horizontal axis is the B-Y axis and the vertical axis is the R-Y axis. On the face of the CRT 18, there are displayed vectors 20 (tip ends of the vectors are displayed as points) of six colors blue, red, magenta, green, cyan and yellow exclusive of white and black from eight colors included in the transmitted color bar signal, and markers 22 indicating the predetermined levels of the errors in amplitude and phase, respectively, of the vectors of said six colors. Although the vectors and the markers are displayed alternately, they appear to be displayed simultaneously because the switching frequency is selected in a flicker-free range. Each of the markers 22 is formed by two arcs 24 indicating the level of amplitude error and two radial line segments 26 indicating the level of phase error.

The characteristic advantage in construction of the vector scope according to the present invention shown in FIG. 2 over the conventional vector scope shown in FIG. 1 resides in the inclusion of the switch 14 and the marker generator 16. The switch 14 can be, for example, a transistor switching circuit and can be replaced by any other type by those skilled in the art. The switching frequency of the switch 14 is preferably of a range free from flickering to eyes for alternate display, but can be lower than that. The marker generator 16 will be described in detail hereinbelow.

Figure 4:
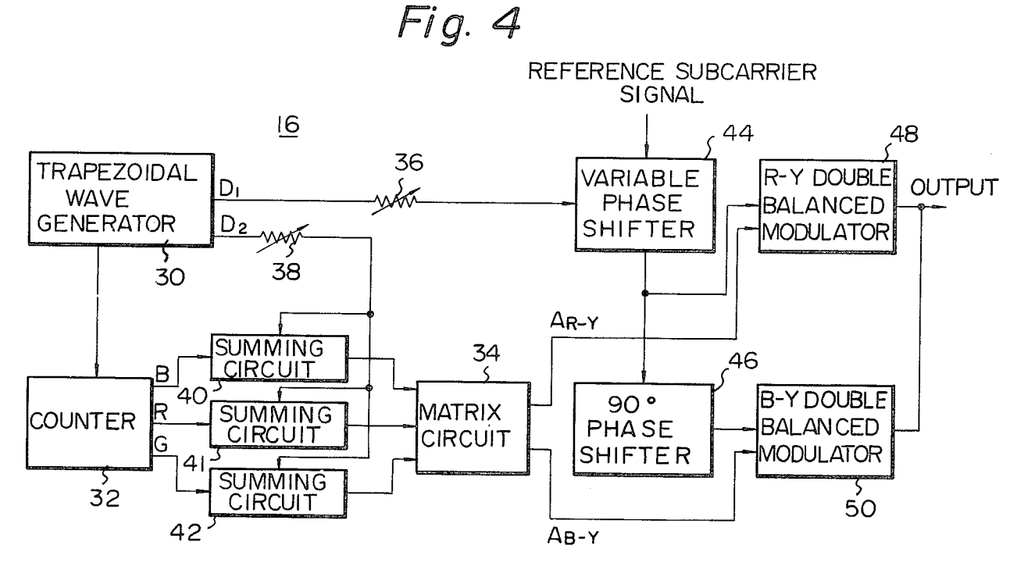
FIG. 4 is a block diagram of a marker generator included in the vector scope according to the present invention.
Figure 5:
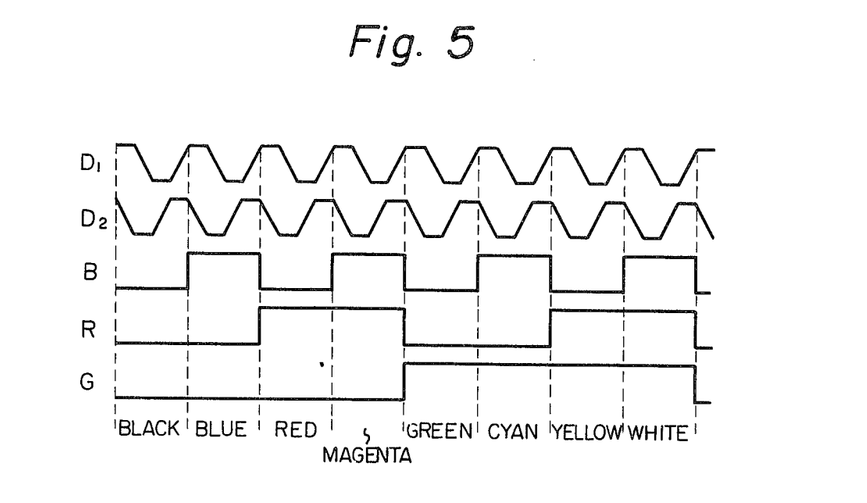
FIG. 5 is a wave form diagram of the circuit of FIG. 4.
Figure 6:
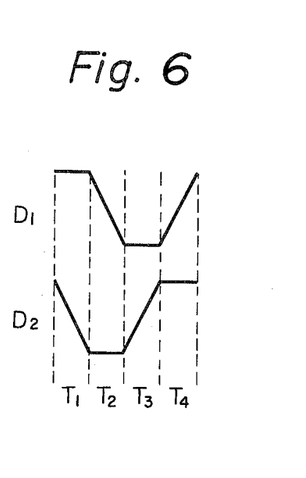
FIG. 6 is a wave form diagram showing in an enlarged scale a cycle of the trapezoidal wave signal shown in FIG. 5.

FIG. 4 shows a block diagram of the circuit of an embodiment of the marker generator 16 according to the present invention. The marker generator 16 comprises a trapezoidal wave generator 30, a counter 32 connected with said generator 30, and a matrix circuit 34 connected with said counter 32. The trapezoidal wave generator 30 (to be described in greater detail hereinbelow) generates trapezoidal wave signal $D_1$ and $D_2$ shown in FIG. 5. These two trapezoidal wave signals are shifted 90° from each other so that the voltage amplitude of one of them rises or falls substantially linearly when the voltage amplitude of the other of them is in one of two predetermined fixed levels as shown in FIG. 6. This means it possible to provide four combinations, namely, $T_1$, $T_2$, $T_3$ and $T_4$, each having different voltage conditions of the two trapezoidal wave signals $D_1$ and $D_2$ within one cycle for one of them. The clock signal used in forming these trapezoidal wave signals is applied also to the counter 32 which divides the frequency of the clock signal by two, four and eight to generate primary color signals B, R and G, respectively, as shown in FIG. 5. These B, R and G signals are for generating color difference signals for a color bar signal. The primary color signals B, R and G are applied to summing circuits 40, 41 and 42, respectively.

The trapezoidal wave signal $D_1$ is applied through a variable resistor 36 to a variable phase shifter 44 and, on the other hand, the trapezoidal wave signal $D_2$ is applied through a variable resistor 38 to the other inputs of the summing circuits 40, 41 and 42. The summing circuit 40 adds the B signal to the trapezoidal wave signal $D_2$ and applies the sum to the matrix circuit 34. The summing circuit 41 adds the R signal to the trapezoidal wave signal $D_2$ and applies the sum to the matrix circuit 34. The summing circuit 42 adds the G signal to the trapezoidal wave signal $D_2$ and applies the sum to the matrix circuit 34. The matrix circuit 34 is designed to generate predetermined color difference signals R-Y and B-Y for the color bar signal when received the primary color signals B, R and G. The primary color signals B, R and G superimposed thereto with the trapezoidal wave signals and applied to the matrix circuit 34, are subjected to the similar process to those for forming the abovedescribed color difference signals and are formed into an R-Y axis amplitude marker signal component $A_{R-Y}$ and B-Y axis amplitude marker signal component $A_{B-Y}$. These marker signal components $A_{R-Y}$ and $A_{B-Y}$ are illustrated by the following formulas, respectively:

$$A_{R-Y} = 0.70 (R+D_1) - 0.59 (G+D_1) - 0.11 (B+D_1)$$

$$A_{B-Y} = -0.30 (R+D_1) - 0.59 (G+D_1) + 0.89 (B+D_1)$$

The R-Y axis amplitude marker signal component $A_{R-Y}$ is thus obtained and applied to an R-Y double balanced modulator 48, and the B-Y axis amplitude marker signal component $A_{B-Y}$ is thus obtained and applied to a B-Y double balanced modulator 50.

The variable phase shifter 44 receiving the reference subcarrier signal from the reference generator 4 advances or lags the phase of the reference subcarrier signal in response to the voltage level of the trapezoidal wave signal $D_1$ and generates a phase marker signal component. The veriable phase shifter 44 is so adjusted that the phase shifting angle is 0° when the voltage of the trapezoidal wave signal $D_1$ is on the intermediate level. The output of the variable phase shifter 44 is applied to the modulator 48 and a 90° phase shifter 46. The 90° phase shifter 46 further shifts 90° the reference subcarrier signal shifted by the variable pahse shifter 44 and applies the resultant signal to the modulator 50. The R-Y axis double balanced modulator 48 double-balanced-modulates the variably phase-shifted reference subcarrier, which is the R-Y axis phase marker component signal, from the variable phase shifter 44, with the R-Y axis amplitude marker component signal from the matrix circuit 34 to generate an R-Y axis marker component signal. The B-Y axis double balanced modulator 50 double-balanced-modulates the reference subcarrier, which is the B-Y axis phase marker component signal, from the 90° phase shifter 46, with the B-Y axis amplitude marker component signal from the matrix circuit 34 to generate a B-Y axis marker component signal. The signals modulated by these modulators 48 and 50 are added together into a marker signal which is outputted to the switch 14. The marker signal generated by the marker generator 16 is the reference carrier chrominance signal and is inputted alternately with the subcarrier signal (that is, the carrier chrominance signal) from the input amplifier 2 through the switch 14 to the demodulators 8 and 10 for double balanced demodulation. The signal generated by the B-Y demodulator 8 receiving the marker signal is the B-Y axis marker component signal generated by the demodulator 50, and the signal generated by the R-Y demodulator 10 receiving the marker signal is the R-Y axis marker component signal generated by the demodulator 48. These two marker component signals are applied to the horizontal and vertical inputs, respectively, of the CRT 18 to generate the markers 22 as shown in FIG. 3.

Figure 7:
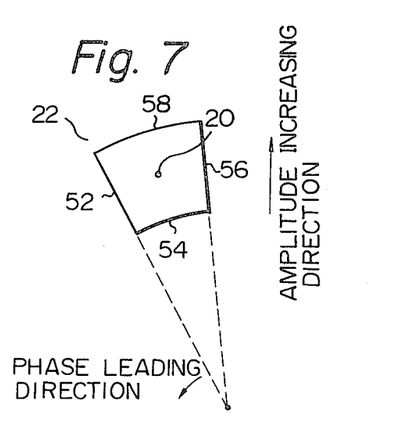
FIG. 7 is an enlarged illustration of the red marker of FIG. 3.

With reference to FIG. 7 showing the red marker of FIG. 3 on an enlarged scale, the markers 22 will be described in detail referring to the red marker as an example. It must be understood, therefore, that the markers of other colors are generated in the same manner. The red marker 22 is displayed as a locus of the tip end of the red signal vector of the color difference signals for the color bar signal formed in the marker generator 16, and the vector is deflected or swang by the two trapezoidal wave signals $D_1$ and $D_2$ generated by the trapezoidal wave generator 30 and having 90° phase difference therebetween. The trapezoidal wave signal $D_2$ to be added to the primary color signals B, R and G acts to change the amplitudes of the primary color signals, thereby varying the amplitudes of the displayed vectors. The range of change of the amplitude can be adjusted by adequately damping the amplitude of the trapezoidal wave signal $D_2$ by the variable resistor 38. The trapezoidal wave signal $D_1$ acts to advance or lag the phase of the reference subcarrier signal by the variable phase shifter 44, thereby varying the pahse of the color signal vectors of the color difference signals for the color bar signal. The range of change in the phase can be adjusted by adequately damping the amplitude of the trapezoidal wave signal $D_1$ by the variable resistor 36, thereby changing the range of the phase shifting by the variable phase shifter 44.

During the time $T_1$ of FIG. 6, $D_1$ is on the high voltage level for maintaining the phase of the vector in the advanced state, while $D_2$ is where the voltage amplitude decreases linearly so as to reduce the vector amplitude linearly, thereby drawing a radial line segment 52 of the marker 22 toward the central axis. During the time $T_2$, $D_1$ is in a state in which the voltage amplitude decreases linearly, thereby lagging the vector phase, and $D_2$ is in the state in which the voltage amplitude becomes low in level, thereby maintaining the vector level low, thereby drawing an arc 54 of the marker 22. Likewise, during the time $T_3$, the vector amplitude is made to increase with the phase maintained in the lagged state, thereby drawing a radial line segment 56, and during the time $T_4$, the phase is advanced with the vector amplitude maintained at a high level, thereby drawing an arc 58. The marker 22 displayed as described above can indicate the range of amplitude error and the range of phase error for the vector 20 of the transmitted color bar signal subjected to distortion from the transmission system. The error level can be set by adjusting the variable resistors 36 and 38 so as to adjust the amplitudes of the trapezoidal wave signals $D_1$ and $D_2$.

Figure 8:
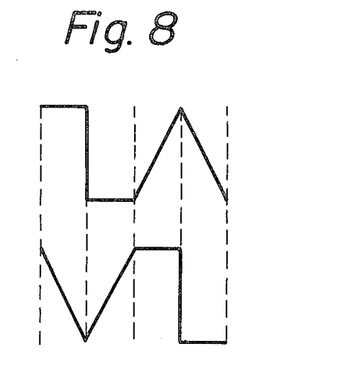
FIG. 8 illustrates an example of a signal wave form which can be used in place of the trapezoidal wave signal.

In the above-described embodiment, two trapezoidal wave signals having 90° phase difference therebetween are used for forming four different combinations, for example, $T_1$, $T_2$, $T_3$ and $T_4$, for deflecting the vectors. This wave form may be changed arbitrarily, for example, to those as shown in FIG. 8, which are combinations of square and trignale waves formed by switching signals from a triangular wave generator and a square wave generator.

Figure 9:
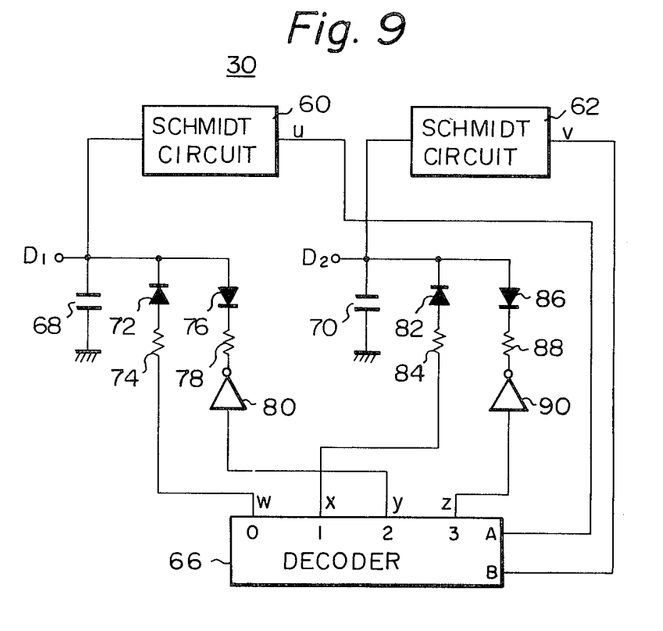
FIG. 9 is a block diagram of a trapezoidal wave generator.

FIG. 9 illustrates a circuit of an embodiment of the trapezoidal wave generator 30 used in the marker generator 16. FIG. 10 illustrates wave form of each component of the circuit in FIG. 7. The trapezoidal wave generator 30 comprises Schmidt circuits 30 and 32 for wave shaping inputs thereto, and the square wave outputs u and v from the Schmidt circuits are connected with the input of a decoder 66 which generates outputs w, x, y and z at output terminals "0", "1", "2", and "3", respectively. The trapezoidal signal outputs $D_1$ and $D_2$ are generated across capacitors 68 and 70, respectively, having one electrodes grounded and the other electrodes connected with the inputs of the Schmidt circuits 60 and 62, respectively. If the outputs u and v of the Schmidt circuits are both on a low level, the output w of the output terminal "0" of the decoder 66 becomes high in level and its signal acts to charge the capacitor 68 through a resistor 74 and a diode 72, thereby increasing the voltage of the output $D_1$. At this stage, the outputs x, y and z of the other output terminals are all low in level, whereby the capacitor 70 remains uncharged and the output $D_1$ is at a predetermined value on the low voltage level. Then, when the output u is high in level and the output v is low in level, only the output x of the "1" output terminal becomes high in level, whereby the capacitor 70 is charged through a resistor 84 and a diode 82, thereby increasing the voltage of the output $D_2$. At the same time, since the outputs x and y are low in level, the capacitor 68 is not charged further through the diode 72, and since the output of an inverter 80 is on a high level, a diode 76 is in a non-conductive state and is not discharged accordingly. As a result, the output $D_1$ of the capacitor 68 is on the predetermined high level. When the outputs u and v are both high in level, only the output y becomes high in level and the output of the inverter 80 becomes low in level to bring a diode 76 into a conductive state, whereby the capacitor 68 is discharged and the output $D_1$ decreases in voltage. At this time, since the outputs x and z are low in level, the capacitor 70 is not charged nor discharged, so that the output $D_2$ is maintained at the predetermined constant high level. When the output u is low and the output v is high in level, only the output z becomes high in level and the output of the inverter 90 becomes low in level to bring a diode 86 into a conductive state, whereby the capacitor 70 is discharged, so that the output $D_2$ decreases in voltage level. At this stage, the capacitor 68 is not charged nor discharged, so that the output $D_1$ is maintained at the predetermined constant low level. Further, when pulses of u and v are inputted, the above-described operation is repeated. This way, two trapezoidal wave signals having a 90° phase difference can be generated therebetween. By using this circuit, it is made possible to secure one of the two trapezoidal wave signals at a predetermined voltage level while the other trapezoidal wave signal is changing in voltage level, without the possibility of causing overshoot or undershoot of wave form due to switching. This property is highly preferably for a signal for deflecting a vector to draw the locus of a marker.

While a cathode ray tube is used as the display device in the embodiment described above, an X-Y plotter may be used as the display. Furhter, the vector scope according to the present invention can be applied to PAL system as well as to NTSC system.

As described above, the present invention provides a noticeable effect that an amplitude distortion and a phase distortion of a subcarrier signal included in a color bar signal transmitted in a transmission system can be measured in high accuracy independently of distortions of demodulator circuit and a display device.

While we have shown and described specific embodiments of our invention, it will be understood that these embodiments are merely for the purpose of illustration and description and various other forms may be made within the scope of our invention, as defined in the appended claims.

What is claimed is:

1. Apparatus for measuring amplitude distortion and phase distortion of a subcarrier of a color television signal transmitted through a transmission system, comprising:
    detector means connected to receive a transmitted color bar signal through the transmission system for detecting a carrier chrominance signal;
    means coupled to said detector means for generating a reference subcarrier signal from a color burst of the detected carrier chrominance signal;
    marker generator means coupled to said means for generating a reference subcarrier signal for generating a reference carrier chrominance signal which includes a signal determining an amplitude error level and a phase error level of each of vectors of color signals which are derived from color difference signals of the transmitted color bar signal;
    switch means connected to receive said carrier chrominance signal and said reference carrier chrominance signal for alternately outputting said carrier chrominance signal and said reference carrier chrominance signal;
    demodulator means connected to receive said reference subcarrier signal and the output from said switch means for generating a demodulated signal; and
    display means for displaying in vector the demodulated signal from said demodulated means.

2. Apparatus as defined in claim 1 wherein said marker generator means comprises:
    error determining means for generating a first signal and a second signal, said first signal determining said amplitude error level and said second signal determining said phase error level;
    means for generating primary color signals, which are for forming a color bar signal, synchronized with said first and second signals;
    marker signal forming means for forming a first marker signal component determining said amplitude error level from said primary color signals and said first signal operative to vary the amplitude of each of said primary color signals and for forming a second marker signal component from said reference subcarrier signal and said second signal operative to vary the phase of said reference subcarrier signal; and
    modulator means connected to receive said first marker signal component and said second marker signal component for generating said reference carrier chrominance signal.

3. Apparatus as defined in claim 2 wherein said marker signal forming means comprises:
    a set of summing means, each of the summing means for summing said first signal and each of said primary color signals to generate a summation signal;
    matrix circuit means connected to receive the set of summation signals for generating color difference signals; and
    variable phase shifter means for varying the phase of said reference subcarrier signal in response to the amplitude of said second signal to generate a variable phase shifted reference subcarrier signal.

4. Apparatus as defined in claim 3 wherein said modulator means comprises a pair of double balanced modulators which carries out the quadrature two phase modulation of said variable phase shifted reference subcarrier signal with said color difference signals generated by said matrix circuit means.

5. Apparatus as defined in claim 2 wherein said error determining means comprises a trapezoidal wave generator means for generating a first and second trapezoidal wave signals, each having a first level and a second level, said second trapezoidal wave signal changes from said first level to said second level when said first trapezoidal wave signal is in said first level and changes from said second level to said first level when said first trapezoidal wave signal is in said second level, and said first trapezoidal signal changes from said second level to said first level when said second trapezoidal wave signal is in said first level and changes from said first level to said second level when said second trapezoidal wave signal is in said second level.

6. Apparatus as defined in claim 5 wherein said error determining means further includes variable means for varying the amplitude of each said trapezoidal wave signals generated by said trapezoidal wave signal generator means.

7. Apparatus as defined in claim 2 wherein each of said first and said second signals generated by said error determining means has a first level and a second level, said second signal changes from said first level to said second level when said first signal is in said first level and changes from said second level to said first level when said first signal is in said second level, and said first signal changes from said second level to said first level when said second signal is in said first level and changes from said first level to said second level when said second signal is in said second level.

8. Apparatus as defined in claim 7 wherein said error determining means further includes variable means for varying the amplitude of each of said first and second signals generated by said error determining means.

9. Apparatus as defined in claim 2 wherein said means for generating the primary color signals includes counter means synchronized with the generation of said first and second signals so that each of different color signals included in said primary color signals is generated during a cycle of either of said first and second signals.

10. Apparatus as defined in claim 1 wherein said display means comprises a cathode ray tube.

11. Apparatus as defined in claim 1 wherein said display means comprises an X-Y plotter.

12. Apparatus as defined in claim 1 wherein said switch means has a predetermined switching frequency.

13. Vector scope for measuring amplitude distortion and phase distortion of a subcarrier signal of a color television signal transmitted through a transmission system, comprising:

an amplifier means connected to receive a transmitted color bar signal through the transmission system for detecting a carrier chrominance signal;

a reference generator for generating a reference subcarrier signal from a color burst of the detected carrier chrominance signal;

a marker generator coupled to said reference generator for generating a reference carrier chrominance signal which includes a signal determining an amplitude error level and a phase error level of each of the vectors of color signals included in color difference signals which are derived from the transmitted color bar signal;

a switch connected to receive said carrier chrominance signal and said reference carrier chrominance signal for alternately outputting said carrier chrominance signal and said reference carrier chrominance signal at a predetermined frequency;

a pair of double balanced demodulators connected to receive said reference subcarrier signal and the output from said switch for generating demodulated signals; and display means for displaying in vector the demodulated signals from each of said pair of demodulators; wherein said marker generator comprises:

a trapezoidal wave generator for generating a first and a second trapezoidal wave signal, each having a first level and a second level, said second trapezoidal wave signal changing from said first trapezoidal wave signal is in said first level and changing from said second level to said first level when said first trapezoidal wave signal is in said second level, and said first trapezoidal signal changing from said second level to said first level when said second trapezoidal wave signal is in said first level and changing from said first level to said second level when said second trapezoidal wave signal is in said second level;

means having counter means for generating primary color signals for an internal color bar, said means being synchronized with the generation of said first and second trapezoidal signals so that each of different color signals included in said primary color signals is generated during a cycle of either of said first and second trapezoidal signals;

a set of summing circuits, each of said summing circuits summing said first trapezoidal wave signal and each of said primary color signals to generate a summation signal;

matrix circuit connected to receive the set of summation signals for generating color difference signals;

variable phase shifter for varying the phase of said reference subcarrier signal in response to the amplitude of said second trapezoidal wave signal to generate a variable phase shifted reference subcarrier signal; and a pair of double balanced modulators connected to receive said color difference signals generated by said matrix circuit and said variable phase shifted reference subcarrier signal for quadrature two phase modulating of said variable phase shifted reference subcarrier signal with said color difference signals to generate said reference carrier chrominance signal.

14. Method for measuring amplitude distortion and phase distortion of a subcarrier signal of a color television signal transmitted through a transmission system, comprising the steps of:

transmitting a color bar signal through a transmission system;

receiving the transmitted color bar signal to generate color difference signals;

providing a signal for generating markers;

applying alternately to display means the color difference signals and said markers generating signal for displaying in vector said color difference signals and said markers generating signals, each of said markers determining an amplitude error level and a phase error level with respect to each of the vectors derived from the vector display of the color difference signals; and comparing the vectors of the color difference signals and the corresponding markers represented by said markers generating signal displayed in vector.

15. Method as defined in claim 14 wherein said signal for generating markers is formed from primary color signals for an internal color bar.

16. Method for measuring distortion of a subcarrier of a color television signal transmitted through a transmission system, comprising the steps of:

receiving a transmitted color bar signal through a transmission system and detecting a carrier chrominance signal therefrom;

providing a reference carrier chrominance signal for indicating levels of amplitude and phase errors of said subcarrier;

demodulating alternately said carrier chrominance signal and said reference carrier chrominance signal through the same path to generate respective color difference signals therefrom; and displaying in vector the color difference signals derived from said carrier chrominance signal and said reference carrier chrominance signal.

17. Vector scope for measuring amplitude distortion and phase distortion of a subcarrier of a color television signal transmitted through a transmission system including means for receiving a transmitted color bar signal through the transmission system to generate a carrier chrominance signal, means for receiving the carrier chrominance signal and generating a reference subcarrier signal from a color burst of the carrier chrominance signal, demodulator means connected to receive the carrier chrominance signal and the reference subcarrier signal for demodulating the carrier chrominance signal to generate color diference signals and display means for displaying in vector the color difference signals, the improvement comprising:

marker generator means connected to receive said reference subcarrier signal for generating a reference carrier chrominance signal having a predetermined pattern of levels of amplitude distortion and a predetermined pattern of levels of phase distortion with respect to said reference subcarrier;

switch means connected between said carrier chrominance signal receiving means and said demodulator means for receiving said carrier chrominance signal and said reference carrier chrominance signal and for alternately providing said carrier chrominance signal and said reference carrier chrominance signal to said demodulator means whereby said carrier chrominance signal and said rereference carrier chrominance signal are demodulated by said demodulator and displayed by said display means.

UNITED STATES PATENT AND TRADEMARK OFFICE
CERTIFICATE OF CORRECTION

PATENT NO. : 4,488,168

DATED : December 11, 1984

INVENTOR(S) : Yoshikatu Mino

It is certified that error appears in the above-identified patent and that said Letters Patent is hereby corrected as shown below:

Col. 9, lines 32-33, after "first", delete "trapezoidal wave signal" and insert -- level to said second level when said first trapezoidal wave signal --.

*Signed and Sealed this*

*Thirtieth* Day of *April 1985*

[SEAL]

*Attest:*

DONALD J. QUIGG

*Attesting Officer*  *Acting Commissioner of Patents and Trademarks*